(12) United States Patent
Rubio et al.

(10) Patent No.: US 10,226,924 B2
(45) Date of Patent: Mar. 12, 2019

(54) PRINTER AND COMPUTER-IMPLEMENTED PROCESS FOR CONTROLLING A PRINTER

(71) Applicant: HEWLETT-PACKARD DEVELOPMENT COMPANY, L.P., Houston, TX (US)

(72) Inventors: Leticia Rubio, Sant Cugat del Valles (ES); Utpal Sarkar, San Quirze del Valles (ES); M. Isabel Borrell, Barcelona (ES); Xavier Farina, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/522,139

(22) PCT Filed: Nov. 13, 2014

(86) PCT No.: PCT/EP2014/074520
§ 371 (c)(1),
(2) Date: Apr. 26, 2017

(87) PCT Pub. No.: WO2016/074731
PCT Pub. Date: May 19, 2016

(65) Prior Publication Data
US 2017/0313062 A1    Nov. 2, 2017

(51) Int. Cl.
*B41J 29/38*       (2006.01)
*B41J 2/045*       (2006.01)
(Continued)

(52) U.S. Cl.
CPC ....... *B41J 2/04588* (2013.01); *B41J 2/04586* (2013.01); *B41J 2/2132* (2013.01);
(Continued)

(58) Field of Classification Search
None
See application file for complete search history.

(56) References Cited

U.S. PATENT DOCUMENTS 5,991,055 A * 11/1999 Haselby ............... H04N 1/1911
                                                       358/505
6,450,614 B1    9/2002 Scheffelin et al.
(Continued)

FOREIGN PATENT DOCUMENTS

EP        2666636       11/2013
WO     WO-2006017800    2/2006

*Primary Examiner* — Matthew Luu
*Assistant Examiner* — Tracey McMillion
(74) *Attorney, Agent, or Firm* — HP Inc. Patent Departement (57) ABSTRACT

A printer for printing on a print medium as said print medium advances through a print zone, the printer including a number of print heads extending over the print zone, each print head including at least one nozzle array wherein at least two adjacent nozzle arrays overlap forming at least one stitching zone in the overlap region; and a printer controller for generating a sequence of nozzle firing commands for each nozzle array to selectively deposit droplets of print fluid on said print medium from said nozzle arrays in accordance with an image to be printed, wherein the printer controller further applies masks having decorrelated patterns to said sequence of firing commands for at least those overlapping nozzles of the nozzle arrays coinciding with the at least one stitching zone to obtain a predetermined optical parameter of the printed image in the stitching zone, irrespective of an offset between two adjacent nozzle arrays.

16 Claims, 5 Drawing Sheets

(51) Int. Cl.
*B41J 2/21* (2006.01)
*G06K 15/10* (2006.01)
*B41J 2/155* (2006.01)

(52) U.S. Cl.
CPC .......... *B41J 2/2146* (2013.01); *G06K 15/107* (2013.01); *B41J 2/155* (2013.01)

(56) References Cited

U.S. PATENT DOCUMENTS

| | | |
|---|---|---|
| 6,493,112 B1 | 12/2002 | Arce |
| 6,623,106 B2 | 9/2003 | Silverbrook et al. |
| 7,044,585 B2 * | 5/2006 | Walmsley ............ B41J 2/04505 347/13 |
| 7,388,686 B2 | 6/2008 | Saquib et al. |
| 8,152,262 B2 | 4/2012 | Seccombe et al. |

* cited by examiner

PRINTER AND COMPUTER-IMPLEMENTED PROCESS FOR CONTROLLING A PRINTER

Traditional printing devices having a carriage moving in a scanning direction and provide an efficient way of printing but can reach a limit in terms of throughput improvement because the carriage needs to cross a print medium for each scan. Another type of printers, called page wide array printer, has been developed which comprises a bar of print heads spanning across the entire print zone and hence across an entire print medium. A page wide array printer allows printing a whole page in a continuous print media movement. A page wide array printer improves printing speed. It may comprise a number of print heads which are arranged adjacent to each other and, as a set, extend across the entire print zone. Each print head may carry one or more dies, each die providing a nozzle array. In order to avoid gaps between print heads during printing, e.g. due to the mechanical variability in the zones between the print heads, there may be an overlap between the nozzle arrays of adjacent print heads to provide nozzle redundancy and to be able to compensate for any possible printing offset. Part of the image printed by the overlapping nozzle sometimes is referred to as a (die) stitching zone, and the remainder of the image, not printed by overlapping nozzle arrays, may be called a non-stitching zone.

Examples of this disclosure are described with reference to the drawings which are provided for illustrative purposes, in which.

According to one example, this disclosure provides a printer for printing on a print medium as said print medium advances through a print zone. The printer may be a page wide array printer or a scanning printer. The page wide array printer may include a number of print heads, the print heads carrying dies for providing arrays of nozzles which, in combination, extend across an entire print zone. Such an arrangement allows the entire width of a print medium to be printed simultaneously. Print media may be of any sort of sheet-like medium, including paper, cardboard, plastic, and textile.

Due to the relative length of the print heads, when compared to their widths, print heads of a page wide array printer also are called print bars. The print bar usually is mounted fixedly relative to the printer, and the print medium on which an image is to be printed is moved perpendicularly to the print bar through a print zone along a print media transport path. A complete image can be printed in a continuous movement of the print medium past the print bar or in multiple passes.

Page-wide array printers are sensitive to local discontinuities in their nozzle arrays arranged in said print bars, e.g. when neighboring nozzle arrays are not perfectly aligned to each other. As the print heads do not move relative to the print medium, it is more difficult to hide any defects caused by the variability of the printer itself. For example, the position of the print heads within the printer and the position of the print head dies or nozzle arrays relative to each other may have a variability of +/−100 µm. In order to avoid gaps between print head dies due to the mechanical variability in the zones between the print head dies, there usually is an overlap of adjacent nozzle arrays to provide nozzle redundancy and to be able to compensate for errors. The part of an image printed by these overlapping nozzles sometimes is referred to as a (die) stitching zone. Print head alignment calibration may help to reduce the variability of print head position but a residual error may remain, this error being big enough to produce perceivable image quality defects.

When printing with a scanning printer, a carriage carries multiple print beads across the print zone wherein, in a scanning printer, the media moves in the direction in which the print head extend, and the carriage moves orthogonally thereto. Traditionally, in a scanning printer, there are staggered print heads with an overlap area of print heads or nozzle arrays to provide for some nozzle redundancy. When using a scanning printer in a single-pass or low-pass printmode for fast printing, multi-pass redundancy cannot be used and different approaches need to be taken to hide defects in the zone of overlap or die stitching zone.

In one example of this disclosure, the printer includes a number of print heads extending over the print zone, each print head including at least one nozzle array wherein at least two adjacent nozzle arrays overlap forming at least one stitching zone in the overlap region; and a printer controller for generating a sequence of nozzle firing commands for each nozzle array to selectively deposit droplets of print fluid on said print medium from said nozzle arrays in accordance with an image to be printed. The printer controller applies masks having decorrelated patterns to said sequence of firing commands for at least those overlapping nozzles of the nozzle arrays coinciding with the at least one stitching zone to obtain a predetermined optical parameter of the printed image in the stitching zone, irrespective of an offset between two adjacent nozzle arrays.

According to one example, the input image of the printer may be a halftone image or contone image, for example a photograph or drawing, which has been processed in an input pipeline to create a halftone image that essentially describes, for every point or pixel of the image, how many drops of which ink should be laid down. From this halftone image a sequence of pulse commands is generated to determine nozzle firing commands which may correspond to electrical or mechanical pulses, physically causing a nozzle to fire. These firing commands then are masked using the decorrelated patterns, also referred to as weaving masks. Accordingly, the sequence of firing commands is masked in a way which is independent of the actual image to be printed. Rather, at every position of the halftone image, the weaving mask "tells" a nozzle whether to obey the firing pulse command, or whether to ignore it even if the image data were telling it to fire.

According to one example, two different masks are applied to overlapping nozzles of two adjacent nozzle arrays, the masks being based on a pair of complementary curves and a halftone algorithm separately applied to each of the curves.

According to one example, the optical parameter corresponds to an optical density, and said masks are calculated to obtain an optical density of the printed image in the stitching zone which is the same or substantially the same as a corresponding optical density of the printed image in a non-stitching zone.

The pair of curves may form a pair of contone ramps M, N, which can be calculated using a halftone algorithm. The halftone algorithm applied to the ramps may be tuned as noise with minimal low frequency components and a rotationally symmetric power spectrum in energy, such as blue noise.

To obtain a decorrelated pattern to mask the sequence of firing commands in such a way that the occurrence of 1's (unmasked commands) in the pattern follows the curves M and N, it would be possible to proceed in several ways. One option is to choose a halftoning algorithm, as indicated above. It should be noted that this halftoning algorithm is not the same as halftoning the input image, which would be performed in the input pipeline of the printer. Rather, a halftoning algorithm, for example, a blue noise algorithm, transforms a matrix of what could be viewed as density data (see curves M and N) in a pattern of zeros (0's) and ones (1's). As the masks are applied to the firing signals, masking can be performed at printing resolution, by actually masking firing commands that will result in dots on the print medium. This can achieve better results than applying similar masks to the data of an input image whose resolution often is less than the final printing resolution.

In general, it is possible to determine a common printing mask to be applied to the entire set of nozzle arrays, so as to decide which nozzle to fire at which time, and to additionally superimpose the decorrelated patterns or weaving masks in the die stitching zone. Alternatively, it is possible to use the decorrelated patterns or weaving masks in the die stitching zone instead of the common printing mask.

This disclosure also provides a computer-implemented process of determining print masks to be applied in a printer and a computer-implemented process for controlling a printer.

Figure 1:
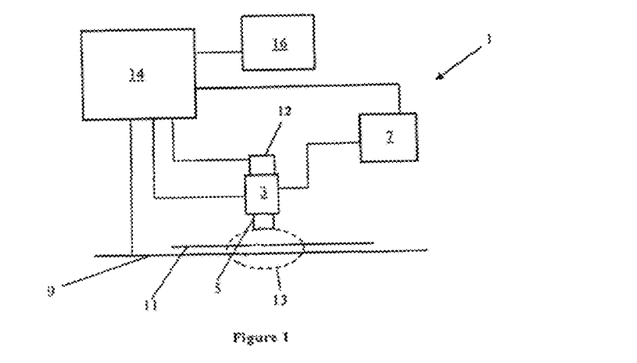
FIG. 1 shows a schematic drawing of a page wide array printer according to one example.

FIG. 1 schematically shows a page-wide array printer 1 as one example of an environment in which the process can be practiced. The printer 1 comprises a print head array 3 on which one or more print bars 5 are mounted. The print head array comprises at least one print bar or a plurality of print bars, such as for different colors, for example. At least one print bar extends across the width of a print zone and hence has substantially the same length as the complete print head array; see FIG. 2.

Ink is supplied to the print bar 5 from an ink tank 7. The printer 1 may comprise a print head array for each color or type of ink or other printing fluid to be printed, each ink having its own tank. However, for clarity, only one print head array is shown, including only one print bar 5.

The print bar comprises a number of nozzles (not shown in FIG. 1) which can be in the region of several hundred, several thousand, or more. An example of the structure of the nozzles is described with reference to FIG. 2.

The printer 1 further comprises a print media transport mechanism 9 which, in use, is operative to transport a print medium 11 to be printed upon through a print zone 13 below the print head array 3. The print media transport mechanism 9 is operable to transport the print medium through the print zone 13 in at least one direction.

A printer controller 14, such as a microprocessor, for example, is operative to control firing of the nozzles and the movement of the print media through the print zone 13. The printer controller also controls the supply of ink to the print bar 5 from the ink tank 7. Instead of one controller, separate controllers could be installed for the print media transport mechanism 9, the print bar 5, and the ink supply from the tank 7. The controller has access to a memory 16. Images or jobs for the printer to print can be stored in the memory 16 until they are printed onto the print media by the printer. The printer controller 14 may store and run one or more program modules for implementing the process according to one or more examples as described herein.

Figure 2:
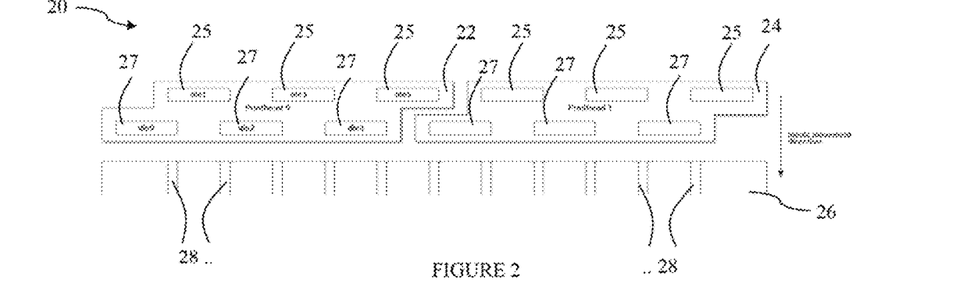
FIG. 2 shows a schematic drawing illustrating a print bar comprising two print heads in a page wide array printer according to one example.

FIG. 2 schematically shows a print head architecture which can be used in the page wide array printer of FIG. 1 and illustrates how die stitching may appear along a print out. The page wide array printer comprises one or more bars 20 of print heads 22, 24 which extends over the whole width of a print medium 26; thus, a whole page of the print medium can be printed with just one continuous media movement, orthogonal to the extension of the print heads 22, 24. Each print head comprises a number of dies 25, 27, each die 25, 27 providing an array of nozzles. Respective adjacent dies 25, 27 and their corresponding nozzle arrays overlap to a certain extent, wherein the overlap zones 28, also referred to as die stitching zone, are schematically indicated as respective stripes or zones on the print medium 26.

A page wide array printer has a superior printing speed but needs particular care to hide repetitive defects caused by the variability of the printer itself and the fact that there is always only a single pass for all required printer qualities.

Figure 3:
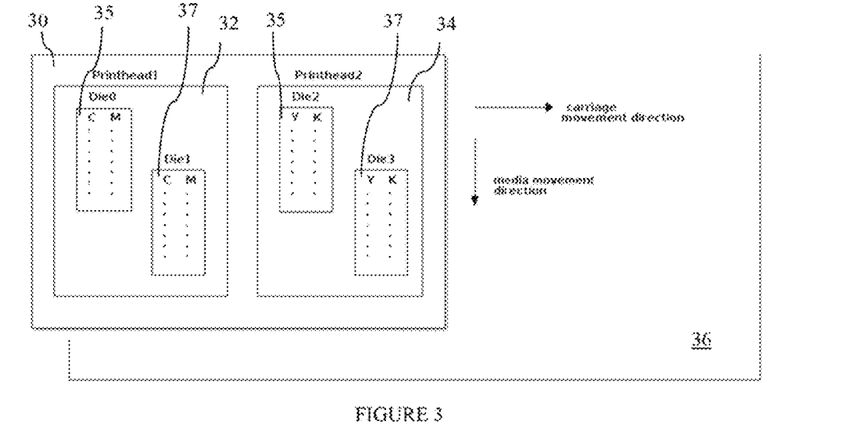
FIG. 3 shows a schematic drawing illustrating two print heads in a scanning printer according to one example.

A similar effect may occur in a scanning printer, when printing in a single-pass or low-pass mode. FIG. 3 shows a schematic example of the carriage architecture of one example of a scanning printer which also can implement the process according to one or more examples as described herein. In this example, a carriage 30 carries two print heads 32, 34, each print head comprising a number of dies 35, 37, each die providing a nozzle array. A print media 36 is shown schematically, the print media moving in a media movement direction, parallel to the extension of the print head dies 35, 37, and the carriage 30 moves orthogonally thereto, in the carriage movement direction. Traditionally, in a scanning printer, the print head dies 35, 37 are staggered with an overlap area, or die stitching zone, between them. In the example shown, print head dies 35, 37 of print head 32 provide two colors, cyan (C) and magenta (M), and there is some nozzle redundancy in the overlap zone of the two print head dies. The same configuration can be found in print head 34 for the colors yellow (Y) and black (K). This nozzle redundancy is particularly useful in one-pass or low-pass print modes to compensate for alignment defects between the two print head dies.

While the present disclosure can be used for both page wide array printers and scanning printers, providing for printing patterns or masks particularly in the die stitching zone, the following examples will refer mostly to page wide array printers.

As explained, page wide array printers usually print an image on a print medium in one pass. When printing an image in one pass, increased grain may be caused by a disturbed distribution between the drops printed by two adjacent dies in the die stitching zone wherein the spread in the worst case of distances between drops may be affected. Further, line banding may occur at the boundaries of the stitching zone, or more generally, when there is a sudden jump in droplet density within the same die. Last but not least, the main cause of tone shift banding is that the change in tone when drops of ink are superimposed is not linear in perception. In the example of FIG. 1, a page wide array including eight print head dies 25, 27 is shown, which gives a total of seven zones of overlap where the image quality could be affected. More or less print heads and print head dies can be used.

As explained above, in the overlap region or stitching zones, there is nozzle redundancy; this means that to print a pixel a printer can choose between two nozzles from two adjacent dies to fire the resultant dot. In order to split the task between two dies, the printer uses masks, which sometimes are called "weaving masks". There can be a large range of possible dot distributions, which may lead to different image quality effects. The most obvious strategy would be to split the desired image in two parts in the stitching zone, so that one of two adjacent dies prints one part of the image and the other one prints a complement. Assuming that there is no dot placement error between the two patterns, they will be perfectly complementary so that every pixel will receive exactly one drop. In the presence of a placement error between two adjacent dies, however, some drops will fall at the same or almost the same location while other pixels will remain white.

Figure 4:
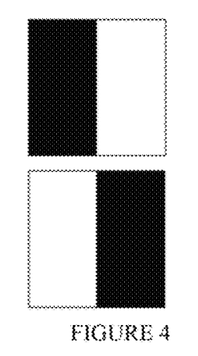
FIG. 4 shows a schematic diagram of a pair of complementary print masks.

The approach of a pair of complementary weaving masks, which are split in two parts at a sharp border line, is shown in FIG. 4. In this weaving mask, the distribution of dots printed from each print head die in the die stitching zone, sharply jumps down (from 1 to 0) from top to bottom, or left to right, for one die and jumps up (from 0 to 1) in a complementary way for the adjacent die, across the die stitching zone, wherein 0's are represented by white and 1's are represented by black.

Figure 5:
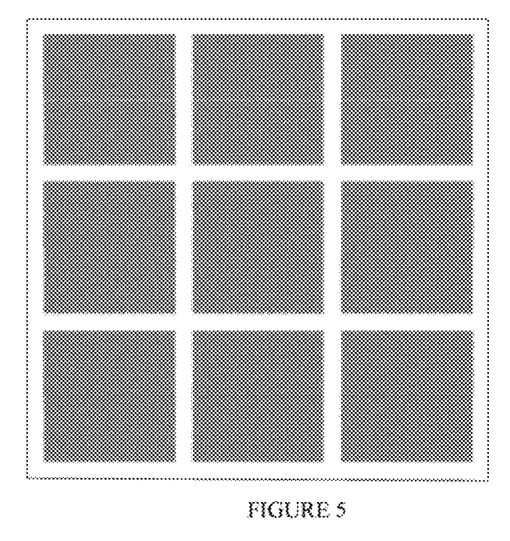
FIG. 5 shows an example of printed images using the complementary print masks of FIG. 4, illustrating the impact in image quality when there is no calibration error and when there are residual calibration errors between print heads.

FIG. 5 shows one example of the impact in image quality using this "sharp" weaving mask, where, in the die stitching zone, the bottom of one die prints one part of the image and the top of the adjacent die prints the other part of the image. The print out of FIG. 5 has been generated under the assumption that in the middle row of printed images (gray rectangles) there is no placement error between the adjacent print head dies, whereas in the top row of printed images (gray rectangles) there is a residual calibration error of e.g. +40 μm, and in the bottom row of printed image (grey rectangles) there is a residual calibration error of e.g. −40 μm between adjacent dies. It can be recognized that no error is perceivable in the middle row whereas a wide band may be perceived throughout the printed images of the top row and a dark band may be perceived throughout the printed images of the bottom row.

Figure 6:
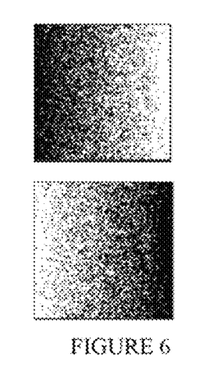
FIG. 6 shows a schematic diagram of another pair of complementary print masks.

The approach of a pair of complementary weaving masks, including a random taper, is shown in FIG. 6. In this weaving mask, the number of dots printed from each print head die in the die stitching zone gradually increases from top to bottom, or left to right, for one die and decreases in a complementary way for the adjacent die, throughout the die stitching zone. The taper has been randomized for one mask, and is complementary thereto in the other mask.

Figure 7:
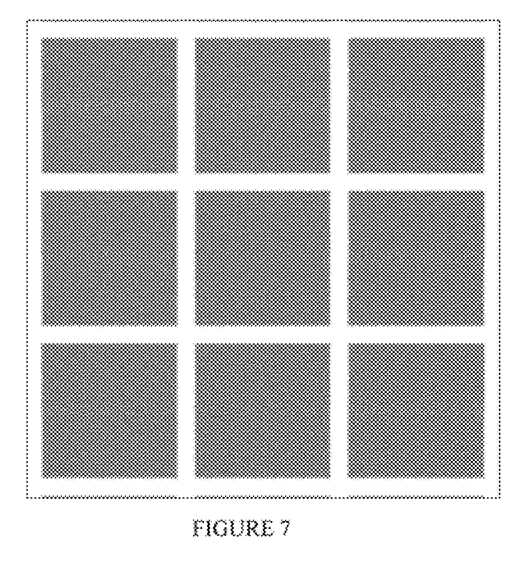
FIG. 7 shows an example of printed images using the complementary print masks of FIG. 6, illustrating an impact in image quality when there is no error and when there are residual calibration errors between print heads.

FIG. 7 shows an example of the impact in image quality when using such a random taper weaving mask in the die stitching zone when there is no calibration error between adjacent dies (middle row of printed images), and when there is a residual calibration error of +/−40 μm between adjacent dies (top and bottom rows). It may be recognized from FIG. 7 that also this random taper weaving mask cannot completely hide print head die placement errors.

In a multi-pass printing mode, such an error could be distributed between all passes and hence become less visible when the number of passes increases so that the image quality can be increased by increasing the number of passes. In one-pass print modes or low-pass print modes of a scanning printer or in a page wide array printer, other parameters may be used to overcome such image quality defects.

For a better understanding of this disclosure, some considerations concerning different mask patterns is explained with reference to FIGS. 8 to 11. The goal of a die stitching strategy essentially is to find an optimal approach to the task of printing two dot patterns on top of each other in such a way that the resulting image is predictable and robust to systematic pattern errors between the two patterns, as well as being visually close to the non-patterned print outside of the zone of die overlap or die stitching zone.

Figure 8:
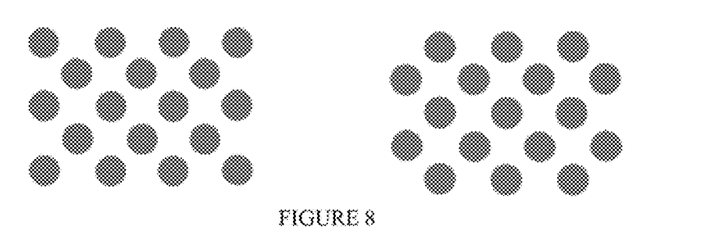
FIG. 8 schematically illustrates one example of a set of patterns printed separately by two print head dies.
Figure 9:
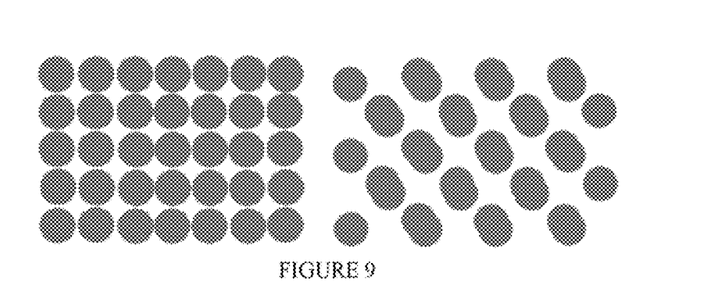
FIG. 9 schematically shows two patterns which are printed in the same area by two print bead dies, without and with placement errors between the two dies, using the set of patterns shown in FIG. 6.

FIG. 8 shows a set of possible patterns to be printed by two finger dies each in the die stitching zone, wherein the pattern on the left will be printed by one die and that on the right will be printed by another die, i.e. both patterns will be printed at the same location. FIG. 9 shows two examples of cases where the two patterns of FIG. 8 have been printed on top of each other in the die stitching zone. On the left-hand side, the two patterns are printed without any placement error between the two. On the right-hand side, exactly the same patterns are printed, but now with a relative error. Easy to recognize, there is considerable change in tone.

Figure 10:
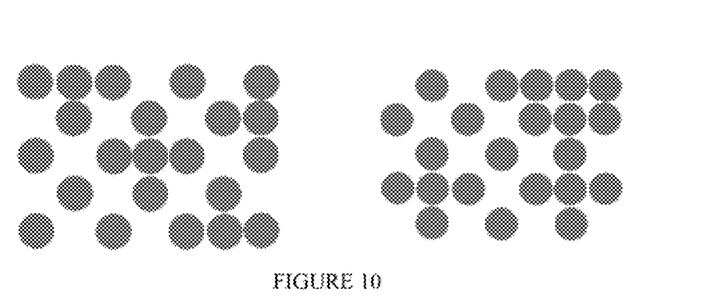
FIG. 10 shows another act of patterns printed separately by two print head dies according to another example.
Figure 11:
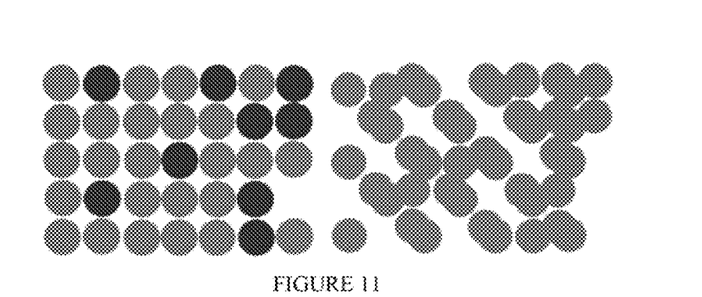
FIG. 11 schematically shows two patterns which are printed in the same area by two print head dies, without and with placement errors between the two dies, using the set of patterns shown in FIG. 8.

FIG. 10 shows another example of a set of two possible patterns to be printed by a pair of dies, each in the die stitching zone. The pattern on the left will be printed by one die, the pattern on the right will be printed by an adjacent die, at the same location. FIG. 11 shows how the two patterns are printed on top of each other in the die stitching zone. On the left-hand side, the two patterns are printed without any placement error between the two; on the right-hand side, exactly the same patterns are printed, but now a relative error. The change in tone is much smaller than in the first example.

As indicated above, a main cause of tone shift banding is that the change in tone when drops of ink are superimposed is not linear in perception. As a specific example, the tone of a sheet of paper in which every possible pixel has a single drop of a given ink will generally be different (darker) than having half of the pixels without ink and the other half with two drops, even though the total amount of ink is the same. This effect could be addressed by decorrelating the patterns defined by the weaving masks for the two overlapping dies and compensating for tone shifts.

Below, it is described how these different considerations may influence the stitching strategy. In general, it has been found that weaving patterns that satisfy the first requirement relating to grain will not be complementary; patterns satisfying the second requirement relating to line banding will smoothly taper out; and patterns satisfying the third requirement relating to tone shift banding will together lay down more ink in the stitching zone than a zone outside the stitching zone. Good weaving masks hence may be decorrelated, tone compensated and may include blue noise ramps.

Decorrelation of the patterns means that the presence or absence of a drop at a given position in one pattern is independent of the presence or absence of a drop at any given position in the companion pattern. In case of complementary patterns, the correlation between the value at a position in one pattern and that at the corresponding position in the other one, is maximal: the presence or absence of a drop in one pattern fully determines the presence or absence of a drop at the corresponding position in the other. This is just the opposite in decorrelated patterns.

In order to have a constant tone, independent of placement errors between adjacent die, theoretically, just the opposite would be needed, namely that all entries between the patterns are independent. This decorrelation of the dot patterns in the die stitching zone will give rise to tone robustness in this zone. Additionally, the tone in the die stitching zone should be equal to the tone outside the die stitching zone, or in the non-stitching zone, which will usually mean that the total amount of ink laid down per unit area will have to be slightly higher than outside the stitching zone, where the drop distribution is maximally homogeneous.

The present disclosure implements decorrelated weaving masks for overlapping nozzles of adjacent nozzle arrays in a die stitching zone which can be applied both to page wide array printers and scanning printers. In one example, tone compensation is computed for each ink based on a printed image or a simulation of a printed output to determine the compensation needed in the die stitching area to generate the same or a similar optical parameter inside and outside the die stitching area. The optical parameter considered may be an optical density or more particularly the contribution of 0, 1, and 2 drops in a pixel to the optical density, as one example. Different models may be used for estimating the optical density per different ink colorant, e.g. a Kubelka Munk Color Model may be used. These parameters relate the optical density with the number of drops at a particular pixel to estimate optical density outside the die stitching zone and to build a pair of masks that, when superimposed, result in the same or about the same optical density inside the die stitching zone as outside, even when one die is displaced with respect to the other. The present disclosure hence proposes weaving masks which are applied in the die stitching zone, wherein two dot patterns of two adjacent dies are superimposed according to the weaving mask configuration. At the same time, outside the die stitching zone, the drops to be fired may be determined using conventional printing masks wherein all dots outside the die stitching zone always will be printed by the same die so that there is no superposition of dot patterns and the dot pattern will match the dot distribution in the printing mask. According to the printing mask configuration, the number of drops per pixel fired hence may be known for each pixel, and the optical density outside the die stitching zone can be computed based on the drops firing with each pixel.

The ink density model is just one example for providing a basis for determining the correlated weaving masks, wherein this model could be refined or simplified and other models could be used. In the example described, a pair of dot patterns, or weaving masks, is determined whose optical densities are as close as possible to the optical density outside the die stitching area, no matter the deviation with respect to the nominal position. In one example, for comparing optical densities, outside the die stitching area the same model is used for the constant distribution of a single drop pixel.

Figure 12:
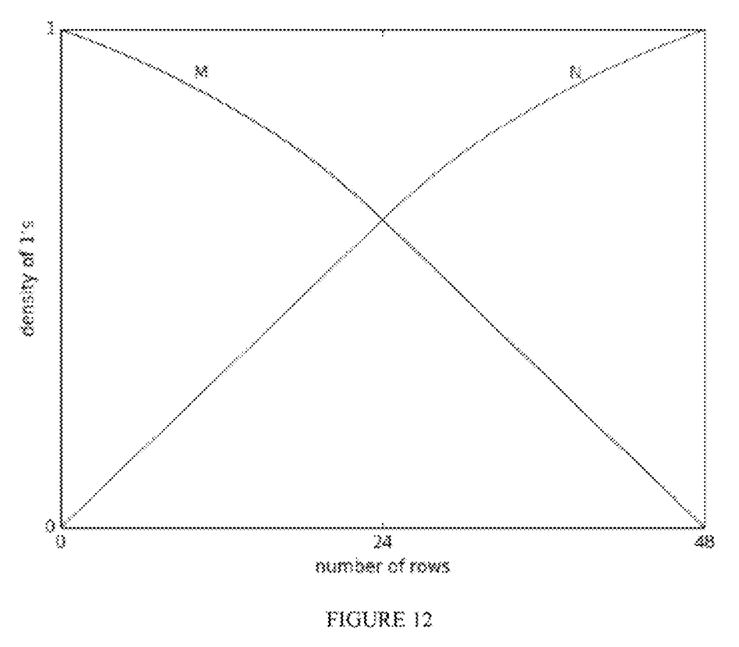
FIG. 12 shows a pair of ramps for deriving masks as shown in FIG. 13.

In one specific example, for each color ink or, more generally, printing fluid, the contribution of 0, 1, and 2 drops in a pixel according to drop size and spectral ink properties is estimated, to determine three parameters per ink (in this example) corresponding to the contribution of different numbers of drops in a pixel to the optical density. Based on these parameters, the optical density of an image outside the die stitching zone is estimated and the slope of a pair of ramps that, row by row, would produce the same optical density within the die stitching zone as outside of the die stitching zone is computed. Based on these slopes, a pair of contone ramps is created which represent the percentage of 1's in each row of the two masks with values from 0 to 255, for example. This pair of contone ramps, designating M and N, can be expressed analytically and graphically and are shown in FIG. 12.

It is assumed that each of the masks has R rows and C columns, wherein the number of rows corresponds to the number overlapping nozzles per die in the stitching zone, such as 48, and the number of columns corresponds to the period of repetition of the masking pattern in the printing direction. The first mask, applied at the bottom of one die, roughly follows the density profile M, the second mask, applied at the top of the next die, roughly follows the density profile N. The profile doesn't have to be followed strictly on a row by row basis, allowing dispersions in the row direction will generally give rise to higher quality patterns.

With the color density of the two ramps together being equal to the color density outside the die stitching zone, the following calculation can be performed:
F(M,N)=D(1), where F represents the optical density of both ramps together in the die stitching zone and D(1) represents the optical density outside the die stitching zone, assuming an even coverage of the non-stitching zone with one drop per pixel. M,N define a family of functions of the rows of the ramp with:

$$M(x) = \begin{cases} \dfrac{(D_1 - D_0) + 2M_0(D_0 - D_1)\left(x + \dfrac{1}{2}\right)}{(D_1 - D_0) + 2M_0(D_0 - 2D_1 + D_2)\left(x + \dfrac{1}{2}\right)} & x \in \left(-\dfrac{1}{2}, 0\right] \\ M_0(1 - 2x) & x \in \left(0, \dfrac{1}{2}\right] \end{cases}$$

where $x = r/R$.

FIG. 12 shows the two complementary ramps which are generated according to the above algorithm, wherein D(i) corresponds to the perceived optical density produced by i drops in a particular pixel, $i \in \{0,1,2\}$ wherein D is a non-linear function and the ramps M, N are complementary. The ramps M, N are complementary in the sense that F(N, M)=D(1); in this example, this means that, in the model parameterized by D, M and N are visual complements for a pattern of tone D(1) which, in turn, corresponds to the density of one drop per pixel.

Figure 13:
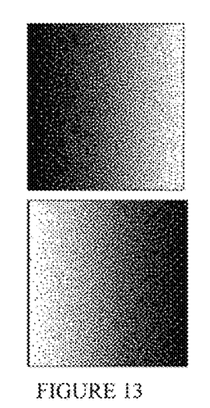
FIG. 13 shows an example of two complementary masks which have been generated based on the ramps of FIG. 12.

To eventually determine the decorrelated weaving masks, a half tone algorithm is separately applied to the two ramps M, N to turn them into ones (1's) and zeros (0's) to achieve a fully decorrelated noise pattern that still maintains the density computed by the model explained above. An example of a pair of decorrelated blue noise weaving masks, calculated based on the above ramps, is shown in FIG. 13. The so determined pair of binary arrays can be used by the printer as weaving masks to split the print job between the two dies in the die stitching zone. In this example, there is a one-to-one relationship between the number of nozzles in the die stitching zone and the number of rows in the weaving masks.

The decorrelated weaving masks of FIG. 13 have the following characteristics: they have the slopes shown in FIG. 12 wherein the slope of each ramp represents the number of ones (1's) in each row of the mask. They are binary masks and they are non-linear. They maintain a smooth density transition in each die, and they exhibit the compensation made to reach the same optical density inside and outside the die stitching zone. As a result, two decorrelated, non-complementary weaving masks are obtained.

Figure 14:
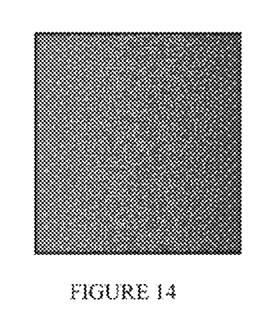
FIG. 14 shows an example of an image printed by two overlapping nozzle arrays, using the masks shown in FIG. 13.

FIG. 14 illustrates how the two decorrelated ramps or weaving masks are superimposed. These weaving masks are applied in a printer for printing on a print medium as said print medium advances through a print zone.

Figure 15:
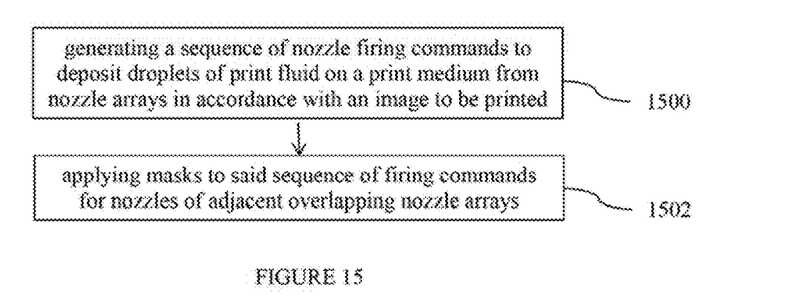
FIG. 15 shows a flow diagram of a method of controlling a printer according to one example.
Figure 16:
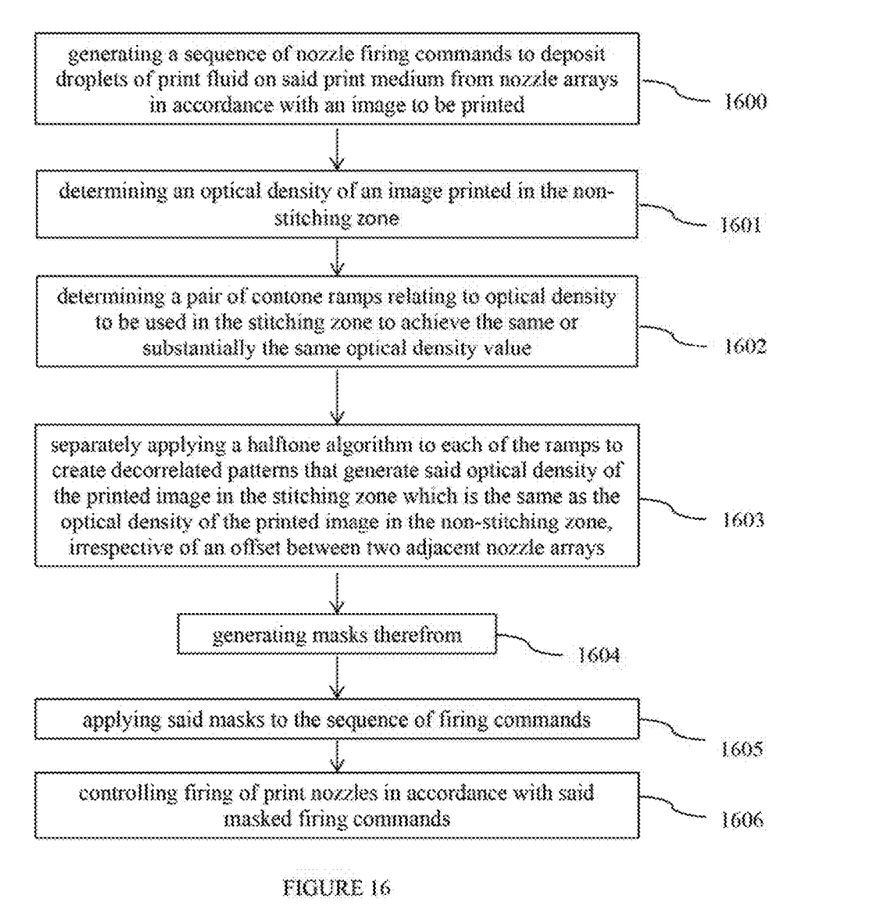
FIG. 16 shows a flow diagram of a method of controlling a printer according to another example.

This disclosure also provides a computer-implemented process of determining print masks to be applied in a printer, examples of which are schematically illustrated in FIGS. 15 and 16.

One example of the process, shown in FIG. 15, includes: generating 1500 a sequence of nozzle firing commands for each nozzle array to selectively deposit droplets of print fluid on said print medium from said nozzle arrays in accordance with an image to be printed; and applying 1502 masks to said sequence of firing commands for at least those nozzles of the nozzle arrays coinciding with a stitching zone to obtain a predetermined optical parameter of the printed image in the stitching zone. Said masks are generated to have decorrelated patterns that generate said predetermined optical parameter of the printed image in the stitching zone, irrespective of an offset between two adjacent nozzle arrays.

The predetermined optical parameter can be an optical density which is the same or substantially the same as an optical density of the printed image in a non-stitching zone; and the optical density of the printed image in the non-stitching zone can be estimated for at least one of a number of reference images, including reference images having 0, 1, or 2 dots of printing fluid per pixel and reference images comprising one color only or a number of colors.

In one example, the optical density of the printed image in the non-stitching zone is estimated for at least one of a number of reference images, each reference image including one color only and one dot per pixel.

According to one example, two different masks are applied to firing commands for overlapping nozzles of two adjacent nozzle arrays, wherein the masks are calculated by separately applying a halftone algorithm to a pair of complementary contone curves. The curves can be calculated as described above.

Another example of the process, as shown in FIG. 16, includes: generating 1600 a sequence of nozzle firing commands for each nozzle array to selectively deposit droplets of print fluid on said print medium from said nozzle arrays in accordance with an image to be printed; and determining masks to be applied to said sequence of firing commands, by: determining 1601 an optical density of an image printed by nozzle arrays in the non-stitching zone; determining 1602 a pair of contone ramps relating to optical density to be used in a stitching zone to achieve the same or substantially the same optical density value in the stitching zone and in the non-stitching zone; separately applying 1603 a halftone algorithm to each of the ramps to create decorrelated patterns that generate said optical density of the printed image in the stitching zone which is the same or substantially the same as the optical density of the printed image in the non-stitching zone, irrespective of an offset between two adjacent nozzle arrays; and the masks are generated 1604 therefrom. Said masks are applied 1605 to the sequence of firing commands; and firing of print nozzles in the stitching zone is controlled 1606 in accordance with said masked firing commands.

For determining the masks, according to one example, the optical density of a constant area fill is estimated as a reference image. Accordingly, the same optical density estimation is used, no matter what specific image is going to be printed. This estimation may include a print mask in the non-stitching zone, e.g. in a multi-pass or multi-array configuration. Decorrelated print masks or weaving masks can be determined so that a weaving mask strategy is fixed per print-mode. A print-mode is determined by how to print an image in a particular media with a particular ink, such as at what speed, at what resolution, with which printing mask etc. The weaving masks, however, are independent of the image to be printed. Rather, they are generated according to a weaving strategy for a particular print mode. All images printed using this print-mode will share the same weaving strategy.

The invention claimed is:

1. A printer for printing on a print medium as said print medium advances through a print zone, the printer including
   a number of print heads extending over the print zone, each print head including at least one nozzle array wherein at least two adjacent nozzle arrays overlap forming at least one stitching zone in the overlap region; and
   a printer controller for generating a sequence of nozzle firing commands for each nozzle array to selectively deposit droplets of print fluid on said print medium from said nozzle arrays in accordance with an image to be printed, wherein
   the printer controller further applies, masks having decorrelated patterns to said sequence of firing commands for at least those overlapping nozzles of the nozzle arrays coinciding with the at least one stitching zone to obtain a predetermined optical parameter of the printed image in the stitching zone, irrespective of an offset between two adjacent nozzle arrays, firing of the nozzles controlled in accordance with the nozzle firing commands, as masked by the masks, to print the image.

2. The printer of claim 1 wherein two different masks are applied to firing commands for overlapping nozzles of two adjacent nozzle arrays, the masks based on a pair of complementary curves and a halftone algorithm separately applied to each of the curves.

3. The printer of claim 2 wherein the optical parameter corresponds to an optical density, and said masks are calculated to obtain an optical density of the printed image in the stitching zone which is the same or substantially the same as a corresponding optical density of the printed image in a non-stitching zone.

4. The printer of claim 2 wherein the pair of curves form a pair of contone ramps M, N.

5. The printer of claim 4 wherein the pair of ramps M, N, each ramp comprising R rows and C columns, are calculated such that F(M,N)=D(1)
where F represents an optical density of both ramps together in the stitching zone and D(1) represents an optical density in the non-stitching zone, and M, N will be a family of functions over the rows of the ramps, with:
M(r)=$M_r$=Density of 1's in row r of M
N(r)=$N_r$=Density of 1's in row r of N
$M_r$, $N_r$: r∈[0, R]→d∈[0,1]
then:

$$M(x) = \begin{cases} \dfrac{(D_1 - D_0) + 2M_0(D_0 - D_1)\left(x + \dfrac{1}{2}\right)}{(D_1 - D_0) + 2M_0(D_0 - 2D_1 + D_2)\left(x + \dfrac{1}{2}\right)} & x \in \left(-\dfrac{1}{2}, 0\right] \\ M_0(1 - 2x) & x \in \left(0, \dfrac{1}{2}\right] \end{cases}$$

where $x = r/R$.

6. The printer of claim 2 wherein the halftone algorithm is a blue noise halftone algorithm generating decorrelated blue noise patterns.

7. The printer of claim 1 wherein the printer is a page wide array printer carrying a number of print heads located adjacent to each other and extending across the print zone, each print head including at least on print head die, each print head die providing one array of nozzles.

8. The printer of claim 1, wherein the predetermined optical parameter obtained by application of the masks to the sequence of firing commands corresponds to an optical parameter of the printed image in a non-stitching zone of non-overlapping nozzles of the nozzle array.

9. A computer-implemented method of determining print masks to be applied in a printer, the printer including
a number of print heads extending over a print zone, each print head including at least one nozzle array wherein at least two adjacent nozzle arrays overlap forming at least one stitching zone in the overlap region; the method comprising
generating a sequence of nozzle firing commands for each nozzle array to selectively deposit droplets of print fluid on said print medium from said nozzle arrays in accordance with an image to be printed,
applying masks to said sequence of firing commands for at least those nozzles of the nozzle arrays coinciding with the at least one stitching zone to obtain a predetermined optical parameter of the printed image in the stitching zone, wherein
said masks are generated to have decorrelated patterns that generate said predetermined optical parameter of the printed image in the stitching zone, irrespective of an offset between two adjacent nozzle arrays, firing of the nozzles controlled in accordance with the nozzle firing commands, as masked by the masks, to print the image.

10. The method of claim 9 wherein the predetermined optical parameter is an optical density which is the same or substantially the same as an optical density of the printed image in a non-stitching zone; and the optical density of the printed image in the non-stitching zone is estimated for at least one of a number of reference images, including reference images having 0, 1, or 2 dots of printing fluid per pixel and reference images comprising one color only or a number of colors.

11. The method of claim 9 wherein the predetermined optical parameter is an optical density which is the same or substantially the same as an optical density of the printed image in a non-stitching zone; and the optical density of the printed image in the non-stitching zone is estimated for at least one of a number of reference images, each reference image including one color only and one dot per pixel.

12. The method of claim 9 wherein two different masks are applied to firing commands for overlapping nozzles of two adjacent nozzle arrays, wherein the masks are calculated by separately applying a halftone algorithm to a pair of complementary contone curves.

13. The method of claim 12 wherein the pair of contone curves is a pair of ramps M, N, and the pair of ramps M, N, each ramp comprising R rows and C columns, are calculated such that F(M,N)=D(1)
where F represents an optical density of both ramps together in the stitching zone and D(1) represents an optical density in the non-stitching zone, and M, N will be a family of functions over the rows of the ramps, with:
M(r)=$M_r$=Density of 1's in row r of M
N(r)=$N_r$=Density of 1's in row r of N
$M_r$, $N_r$: r∈[0, R]→d∈[0,1]
then:

$$M(x) = \begin{cases} \dfrac{(D_1 - D_0) + 2M_0(D_0 - D_1)\left(x + \dfrac{1}{2}\right)}{(D_1 - D_0) + 2M_0(D_0 - 2D_1 + D_2)\left(x + \dfrac{1}{2}\right)} & x \in \left(-\dfrac{1}{2}, 0\right] \\ M_0(1 - 2x) & x \in \left(0, \dfrac{1}{2}\right] \end{cases}$$

where $x = r/R$.

14. The method of claim 12 wherein the decorrelated patterns are blue noise patterns.

15. A computer-implemented method for controlling a printer, the printer including a number of print heads extending over a print zone, each print head including at least one nozzle array wherein at least two adjacent nozzle arrays overlap forming at least one stitching zone in the overlap region and at least one non-stitching zone; the method comprising:
generating a sequence of nozzle firing commands for each nozzle array to selectively deposit droplets of print fluid on said print medium from said nozzle arrays in accordance with an image to be printed,
determining masks to be applied to said sequence of firing commands, including:
determining an optical density of an image printed by nozzle arrays in the non-stitching zone;
determining a pair of contone ramps relating to optical density, the ramps to be applied to the overlapping nozzle arrays in the stitching zone to achieve the same or substantially the same optical density in the stitching zone and in the non-stitching zone;
separately applying a halftone algorithm to each of the ramps to create decorrelated patterns that generate said optical density of the printed image in the stitching zone which is the same or substantially the same as the optical density of the printed image in the non-stitching zone, irrespective of an offset between two adjacent nozzle arrays;

applying said masks to the sequence of firing commands; and controlling firing of print nozzles in the stitching zone in accordance with said masked firing commands.

16. The method of claim 15 wherein the decorrelated patterns are decorrelated blue noise patterns.

* * * * *

UNITED STATES PATENT AND TRADEMARK OFFICE
CERTIFICATE OF CORRECTION

PATENT NO. : 10,226,924 B2  
APPLICATION NO. : 15/522139  
DATED : March 12, 2019  
INVENTOR(S) : Leticia Rubio et al.

Page 1 of 1

It is certified that error appears in the above-identified patent and that said Letters Patent is hereby corrected as shown below:

On the Title Page

Item (74), Attorney, Agent or Firm, in Column 2, Lines 1-2, delete "HP Inc. Patent Departement" and insert -- HP Inc. Patent Department --, therefor.

Signed and Sealed this  
Ninth Day of July, 2019

Andrei Iancu  
*Director of the United States Patent and Trademark Office*